(No Model.)
A. & G. A. KURTIS.
CLOTHES LINE FASTENER.
No. 565,212. Patented Aug. 4, 1896.
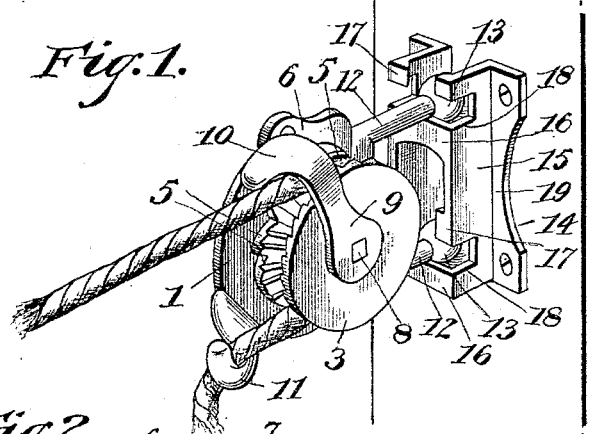
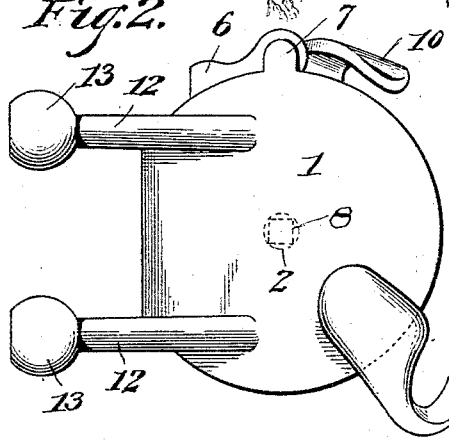
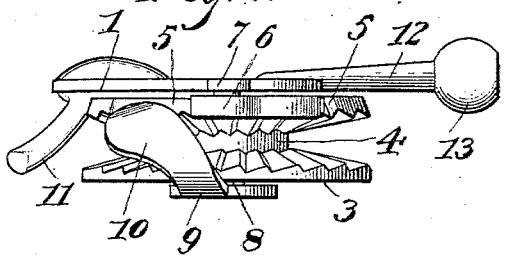
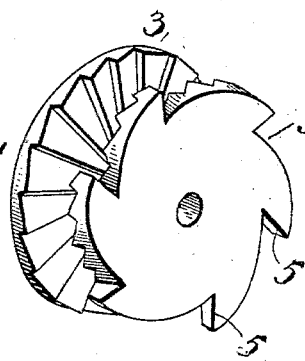
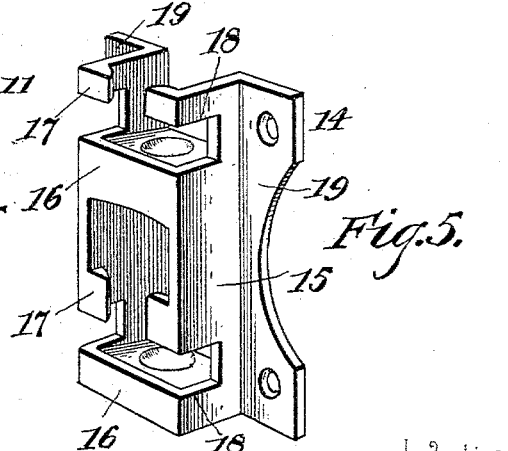
Witnesses
B. S. Ober
R. M. Smith
Inventors
Adam Kurtis
George A. Kurtis
By their Attorneys
C. A. Snow & Co.

UNITED STATES PATENT OFFICE.

ADAM KURTIS AND GEORGE A. KURTIS, OF ERIE, PENNSYLVANIA.

CLOTHES-LINE FASTENER.

SPECIFICATION forming part of Letters Patent No. 565,212, dated August 4, 1896.

Application filed April 5, 1895. Serial No. 544,671. (No model.)

*To all whom it may concern:*

Be it known that we, ADAM KURTIS and GEORGE A. KURTIS, citizens of the United States, residing at Erie, in the county of Erie and State of Pennsylvania, have invented a new and useful Clothes-Line Fastener, of which the following is a specification.

This invention relates to an improvement in devices for fastening, tightening, and holding clothes-lines in place.

The object of the present invention is to provide a simple and effective device which is capable of being readily and quickly applied to and removed from a socket-plate in which the same is swiveled, and which may be secured to a fence-post or a fence-board, the wall of a house, or any other convenient point.

A further object of the invention is to construct a clothes-line fastener in such manner that any slack in the clothes-line may be quickly and easily taken up.

To accomplish the above object, the invention consists in the construction and features hereinafter fully described, illustrated in the drawings, and pointed out in the claims.

In the accompanying drawings, Figure 1 is a perspective view of the complete fastening device shown applied and in position with a clothes-line applied thereto. Fig. 2 is a side elevation of the swiveling bracket and the pulley carried thereby. Fig. 3 is a plan view of the same. Fig. 4 is a detail perspective view of the grooved and serrated pulley. Fig. 5 is a similar view of the stationary supporting-bracket.

Similar numerals of reference indicate corresponding parts in the figures of the drawings.

Referring to the drawings, 1 designates a metallic supporting-plate, which is made substantially in the form of a flat disk and provided upon one side with a centrally-arranged horizontal stud-shaft 2, upon which is revolubly mounted a pulley 3 of peculiar construction. The pulley 3 is formed with a deep peripheral groove 4, the opposite sides of which are toothed or serrated, as shown, and said teeth are preferably arranged is such relation to each other that the point of each tooth upon one side of the groove will be located about midway between the corresponding points of the teeth upon the opposite side of the groove, this arrangement of the teeth serving to more thoroughly grasp and engage a clothes-line passing around or partially around said pulley and within the groove, and also serving to kink said line, effectually preventing the escape of the line from such serrated groove 5.

Upon one side the pulley is provided with notches or with ratchet-teeth, as indicated at 5, with which a pivoted gravity-dog 6 coöperates for permitting the pulley to be revolved in one direction, but serving to prevent retrograde movement thereof. The dog 6 is pivoted on a short stud 7 on the supporting-plate 1, and is preferably located above the pulley, so that it can act by gravity and be in a convenient position for enabling a person to withdraw said dog from its engagement with the pulley 3. The stud-shaft 2, upon which the pulley is mounted, is squared and shouldered, as indicated at 8, for the reception of a guide arm or finger provided with a square perforation adapted to fit snugly the squared end of said stud-shaft, upon which it is preferably riveted in such manner as to leave ample room between it and the supporting-plate 1 for the free rotation of the pulley. At its outer end this arm (designated by the numeral 9) is provided with an overhanging lip 10, located above the pulley and serving as a guide for directing the clothes-line properly to the serrated groove of the pulley and serving also to prevent said line from being accidentally thrown off the pulley.

Located beneath the pulley and slightly in advance thereof is a lower guide or hook 11, which is preferably formed integrally with the supporting-plate 1, said hook projecting across the periphery of the pulley and serving to support the lower end of the clothes-line and to hold the same in its proper relation with the pulley.

Extending rearwardly from the supporting-plate 1 are a pair of horizontal arms 12, upon the outer or rear ends of which are arranged knobs or balls 13. The arms 12 and the balls 13 are preferably formed integrally with the main supporting-plate and are adapted to be engaged with a slotted stationary plate 14, adapted to be secured to any suitable fixed support. The stationary plate or bracket 14 comprises a forwardly-extending pair of plates or flanges 15, which are connected at the bottom and near the top with horizontal webs 16, which are concaved on their upper faces, as shown. The side plates or flanges 15 are also provided with inwardly-extending lips 17 and with notches or slots 18. The lower knob or ball on the supporting-plate 1 passes between the upper web 16 and the lower pair of inwardly-projecting lips 17 and rests within the concavity or socket in the upper face of the lower web 16, while the upper knob or ball on the plate 1 passes above the upper pair of inwardly-projecting lips 17, and when lowered rests in the concavity or socket in the upper face of the upper web 16. A ball-and-socket joint is thus formed, the lips 17 serving to prevent the escape of the swinging member of the bracket and the side notches or slots 18 adapting said swinging member to be vibrated to one side or the other in a manner that will be readily understood. Perforated ears 19 on the stationary bracket provide for its attachment to any suitable fixed support.

In operation the end of the clothes-line is inserted beneath the upper guide 10 and then passed around the pulley, whence it passes out over the lower hook. By pulling upon the lower end of the rope or line the slack may be taken up therein, in which operation the grooved and serrated pulley is revolved. When the line has been sufficiently tightened, it will remain in such condition by reason of the engagement of the gravity-dog with the ratchet-teeth on the pulley. The line may be withdrawn from off the pulley by throwing the dog out of engagement when the pulley is left free to revolve in a reversed direction.

By reason of the construction above described and the particular manner in which the swinging member of the device is secured to the stationary member the pulley and its supporting-plate, with or without the clothes-line attached, may be removed and stored away under cover when not in use, thereby obviating its exposure to the elements and the consequent rusting or injury, calculated to render the same inoperative. It will be apparent also that various changes in the form, proportion, and the minor details of construction may be resorted to without departing from the principle or sacrificing any of the advantages of this invention.

Having thus described the invention, what is claimed as new, and desired to be secured by Letters Patent, is—

1. A clothes-line supporting and adjusting device, comprising a stationary bracket secured to a fixed support, a separable and independent frame detachably applied to said bracket and having a hinged and swinging relation thereto, a revoluble pulley carried by and journaled on the hinged frame and provided with peripheral ratchet-teeth, guides for directing the line to said pulley and confining the same thereon, and a pawl pivotally mounted on the hinged frame and engaging the peripheral teeth of the pulley, whereby retrograde movement of said pulley is prevented, substantially as described.

2. A clothes-line fastening and adjusting device comprising a stationary member adapted to be secured to a fixed support, and the detachable member connected therewith by means of a ball-and-socket joint, a grooved and serrated pulley revolubly mounted upon the detachable member, and the ratchet-teeth and pivoted dog for preventing said pulley from revolving in one direction, substantially as and for the purpose described.

3. In a clothes-line securing and adjusting device, a slotted and socketed stationary member adapted to be applied to a fixed support, in combination with a separable and detachable member connected therewith by means of a ball-and-socket joint, a grooved and serrated pulley mounted on said detachable member, one or more guides or hooks for directing a clothes-line to and properly supporting the same with relation to said pulley, and a pawl or dog operating in connection with said pulley adapting the latter to be revolved in one direction but preventing retrograde movement thereof, substantially as specified.

4. In a supporting and adjusting device for clothes-lines, a slotted and socketed member adapted to be secured to a fixed support, in combination with a separable and detachable member provided with a pair of horizontally-extending arms having knobs or balls at their inner ends adapted to enter and engage the sockets in the stationary member, said knobs or balls being located in the same vertical plane, a grooved and serrated pulley revolubly mounted on said detachable member, and provided with ratchet-teeth, a pivoted dog operating in connection therewith, and suitable guides or hooks for directing the clothes-line and supporting the same in proper relation to said pulley, substantially as described.

In testimony that we claim the foregoing as our own we have hereto affixed our signatures in the presence of two witnesses.

ADAM KURTIS.
GEORGE A. KURTIS.

Witnesses:
W. E. BUSHNELL,
HENRY A. CLARK.